United States Patent
Golden et al.

(10) Patent No.: US 10,430,282 B2
(45) Date of Patent: Oct. 1, 2019

(54) OPTIMIZING REPLICATION BY DISTINGUISHING USER AND SYSTEM WRITE ACTIVITY

(71) Applicant: PURE Storage, Inc., Mountain View, CA (US)

(72) Inventors: Christopher Golden, Mountain View, CA (US); Malcolm Sharpe, Mountain View, CA (US); Steve Hodgson, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 87 days.

(21) Appl. No.: 14/508,698

(22) Filed: Oct. 7, 2014

(65) Prior Publication Data

US 2016/0098191 A1    Apr. 7, 2016

(51) Int. Cl.
  *G06F 11/14*    (2006.01)
  *G06F 3/06*     (2006.01)
  (Continued)

(52) U.S. Cl.
  CPC .......... *G06F 11/1451* (2013.01); *G06F 3/061* (2013.01); *G06F 3/065* (2013.01); *G06F 3/0619* (2013.01); *G06F 3/0641* (2013.01); *G06F 3/0658* (2013.01); *G06F 3/0683* (2013.01); *G06F 11/1453* (2013.01); *G06F 12/10* (2013.01); *G06F 11/2094* (2013.01); *G06F 2212/1016* (2013.01); *G06F 2212/1032* (2013.01); *G06F 2212/2532* (2013.01); *G06F 2212/261* (2013.01)

(58) Field of Classification Search
  None
  See application file for complete search history.

(56) References Cited

U.S. PATENT DOCUMENTS 5,208,813 A    5/1993    Stallmo
5,403,639 A    4/1995    Belsan
(Continued)

FOREIGN PATENT DOCUMENTS

CN    103370685 A    10/2013
CN    103370686 A    10/2013
(Continued)

OTHER PUBLICATIONS

Microsoft Corporation, "GCSettings.IsServerGC Property", Retrieved Oct. 27, 2013 via the WayBack Machine, 3 pages.
(Continued)

*Primary Examiner* — Charles J Choi

(57) ABSTRACT

Systems, methods, and computer readable storage mediums for maintaining the history of remapped data in a storage system. A first portion of a first medium may be remapped to a second medium as part of read optimization operations, wherein the second medium is younger than the first medium. A tag associated with the first portion of the first medium may be retained when the first portion is remapped to the second medium. When the second medium is replicated to another storage array, the first portion of the first medium may be prevented from being replicated based on the tag identifying the first portion as being part of a previous replication operation.

9 Claims, 9 Drawing Sheets

(51) Int. Cl.
  *G06F 12/10*  (2016.01)
  *G06F 11/20*  (2006.01)

(56) References Cited

U.S. PATENT DOCUMENTS

| | | |
|---|---|---|
| 5,940,838 A | 8/1999 | Schmuck et al. |
| 6,263,350 B1 | 7/2001 | Wollrath et al. |
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Masaaki et al. |
| 6,834,298 B1 | 12/2004 | Singer et al. |
| 6,850,938 B1 | 2/2005 | Sadjadi |
| 6,915,434 B1 | 7/2005 | Kuroda |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,117,464 B1 | 2/2012 | Kogelnik |
| 8,170,991 B1 * | 5/2012 | Dhakras ............... G06F 11/1448 707/640 |
| 8,205,065 B2 | 6/2012 | Matze |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,615,641 B2 | 12/2013 | Sampathkumar |
| 8,621,241 B1 | 12/2013 | Stephenson |
| 8,682,870 B1 * | 3/2014 | Gardner ............... G06F 11/1469 707/692 |
| 8,700,562 B2 * | 4/2014 | Schmitt ............ G06F 17/30368 707/607 |
| 8,700,875 B1 | 4/2014 | Barron et al. |
| 8,751,454 B1 * | 6/2014 | Bushman ................ G06F 3/061 707/640 |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0005163 A1 * | 1/2012 | Ahrens ............... G06F 11/1435 707/646 |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0013563 A1 * | 1/2013 | Prahlad ................ G06F 3/0607 707/639 |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0189211 A1 * | 7/2014 | George ................ G06F 3/0613 711/103 |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |

(56) References Cited

FOREIGN PATENT DOCUMENTS

| | | |
|---|---|---|
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

\* cited by examiner

__OPTIMIZING REPLICATION BY DISTINGUISHING USER AND SYSTEM WRITE ACTIVITY__

BACKGROUND

Technical Field

Embodiments described herein relate to storage systems, and more particularly, to techniques for optimizing replication in a storage system.

Description of the Related Art

Various applications executing on a computer system may store and access data stored on one or more storage devices of a storage system. As the data is modified over time, the storage system needs to keep track of the changes, update mappings, and free up storage locations corresponding to deleted data so that these storage locations can be used for new data.

Accordingly, a typical storage system may execute garbage collection and/or read optimization processes to reduce the complexity of the mappings and data stored on the storage system. These processes tend to mimic user activity, and as these processes move data and create new mappings, original metadata associated with the data may be deleted. As a result, old data that was relocated for the purposes of garbage collection or read optimization may look like new data from the storage system's perspective. Accordingly, relocated data may be sent to another storage system during replication even if this data already exists on the other storage system. Therefore, techniques for tracking relocated data and performing more efficient replication are desired.

SUMMARY

Various embodiments of systems and methods for tracking relocated data and performing more efficient replication in a storage system are contemplated.

In one embodiment, a storage system may include one or more storage arrays, with each storage array including a storage controller and one or more storage devices. In one embodiment, the storage controller may utilize volumes and mediums to track stored client data. A medium may be defined as a logical grouping of data. In various embodiments, each volume may be mapped to a single anchor medium, and the anchor medium for a given volume may be mapped to any number of levels of underlying mediums in a medium hierarchy of the given volume.

During operation of a storage system, data that already exists in a medium hierarchy of a given volume may be relocated to another portion higher up in the medium hierarchy of the given volume. In one embodiment, this relocation may be the result of read optimization operations. The storage controller may be configured to differentiate between system activity that mimics user writes, such as relocation of data, and actual user writes. In one embodiment, the storage controller may achieve this differentiation by maintaining a tag for each write operation to identify when the write operation was performed and/or which entity is the owner of this write operation. In various embodiments, the tag may be a sequence number, timestamp, original medium ID, transaction ID, snapshot ID, or other identifier. When a portion of data is relocated due to a read optimization operation, the storage controller may retain the one or more tags which are associated with this portion of data. The storage controller may also be configured to maintain a medium history table which records the history of each of a plurality of medium hierarchies rather than the evolution of the medium hierarchies. The medium history table in combination with the tags may allow the storage controller to perform replication without copying previously replicated data.

In one embodiment, the tag may be a sequence number, and the storage controller may store a sequence number for each mapping table entry corresponding to a portion of a medium. In one embodiment, the sequence number may be a monotonically increasing number which is assigned to each write operation. When data is relocated as part of read optimization operations, the mapping table entries of the data may be reassigned to a new medium higher up in the medium hierarchy. However, these mapping table entries may retain their sequence number to identify when the data was originally written.

In one embodiment, when a new medium is allocated in the storage system, the storage controller may record the highest sequence number in existence at the moment when the new medium was allocated. This highest sequence number may then be stored with the new medium in the medium history table. When a request to replicate the new medium is generated, the storage controller may only replicate data of the new medium which corresponds to mapping table entries with sequence numbers higher than the sequence number stored for the new medium in the medium history table. The storage controller may prevent data from being replicated if the data corresponds to mapping table entries with sequence numbers less than or equal to the new medium's stored sequence number. In this way, the storage controller may replicate only the new data of the new medium and prevent old data that has been relocated into the new medium from being replicated.

These and other embodiments will become apparent upon consideration of the following description and accompanying drawings.

Figure 1:
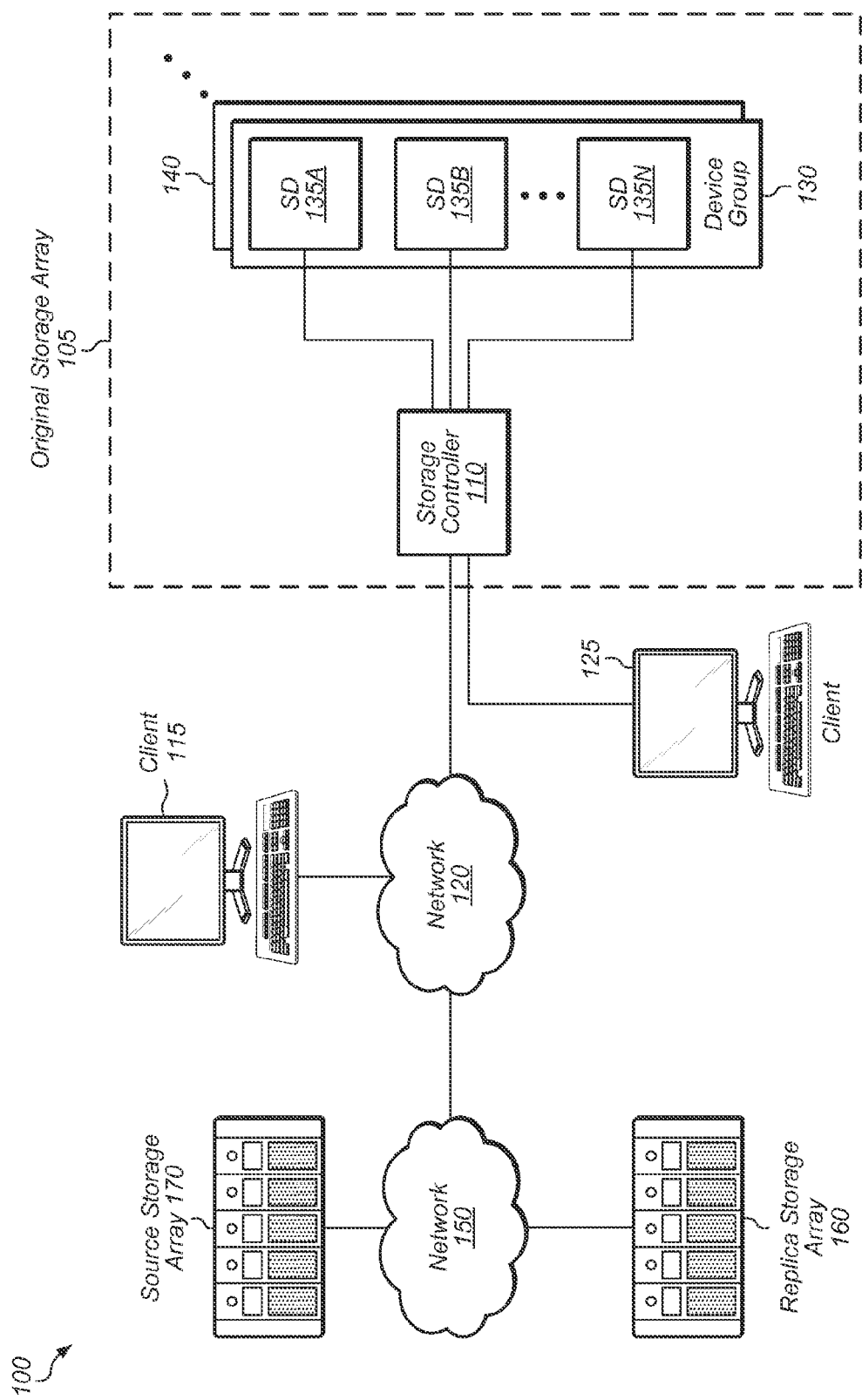
FIG. 1 is a generalized block diagram illustrating one embodiment of a storage system.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage controller . . . " Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include original storage array 105, replica storage array 160, and source storage array 170. Original storage array 105 may include storage controller 110 and storage device groups 130 and 140, which are representative of any number of storage device groups. Although not shown in FIG. 1, replica storage array 160 and source storage array 170 may also include one or more storage controllers and one or more storage device groups. It is noted that storage arrays 105, 160, and 170 may also be referred to as storage subsystems or storage systems.

As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110. It is also noted that original storage array 105 may include more than one storage controller in some embodiments.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140.

Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various deduplication techniques for reducing the amount of data stored in devices 135A-N.

Storage controller 110 may be configured to create and manage mediums in system 100. Accordingly, a set of mediums may be recorded and maintained by storage controller 110. The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

A medium may be virtual such that it is identified by a unique ID, and all blocks stored to a volume while the corresponding medium is open for writing may be recorded as <medium, block number>. Each medium logically comprises all of the blocks in the medium. However, only the blocks that were written to the medium from the time the medium was created to the time the medium was closed are recorded and mappings to these blocks may also be maintained with the medium.

The term "medium" is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, multiple mapping tables may be maintained by storage controller 110. These mapping tables may include a medium mapping table, a volume-to-medium mapping table, a medium history table, an address translation table, a deduplication table, an overlay table, and/or other tables. In some embodiments, the information stored in two or more of these tables may be combined into a single table. The medium mapping table may be utilized to record and maintain the mappings between mediums and underlying mediums and the volume-to-medium mapping table may be utilized to record and maintain the mappings between volumes and anchor mediums. In one embodiment, a volume may be mapped to an anchor medium which is in a read-write state. The anchor medium may then be mapped to any number of underlying mediums (or portions of mediums) in the medium mapping table. A sector or other portion of a medium may be referred to as "underlying" a volume if the sector or portion of the medium is included within the volume. In other words, a given sector of a medium may "underlie" a volume if the anchor medium of the volume maps to the given sector.

The address translation table may include a plurality of entries, with each entry holding a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium or snapshot during a lookup operation corresponding to a received read/write request. This physical pointer value may then be used to locate a physical location within the storage devices 135A-N. It is noted that the physical pointer value may be used to access another mapping table within a given storage device of the storage devices 135A-N. Consequently, one or more levels of indirection may exist between the physical pointer value and a target storage location.

In various embodiments, the address translation table may be accessed using a key comprising a medium or snapshot ID, a logical or virtual address, a sector number, and so forth. A received read/write storage access request may identify a particular volume, sector, and length. The volume ID may be mapped to a medium or snapshot ID using the volume to medium mapping table. A sector may be a logical block of data stored in a medium, with a sector being the smallest size of an atomic I/O request to the storage system. In one embodiment, a sector may have a fixed size (e.g., 512 bytes) and the mapping tables may deal with ranges of sectors. For example, the address translation table may map a medium in sector-size units. The areas being mapped may be managed as ranges of sectors, with each range consisting of one or more consecutive sectors. In one embodiment, a range may be identified by <medium, start sector, length>, and this tuple may be recorded in the address translation table and medium mapping table. In one embodiment, the key value for accessing the address translation table may be the combination of the medium ID and the received sector number. A key is an entity in a mapping table that distinguishes one row of data from another row. In other embodiments, other types of address translation tables may be utilized.

In one embodiment, the address translation table may map mediums and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

Networks 120 and 150 may utilize a variety of techniques including wireless connection, direct local area network (LAN) connections, wide area network (WAN) connections such as the Internet, a router, storage area network, Ethernet, and others. Networks 120 and 150 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 120 and 150. The networks 120 and 150 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

It is noted that in alternative embodiments, the number and type of storage arrays, client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Figure 2:
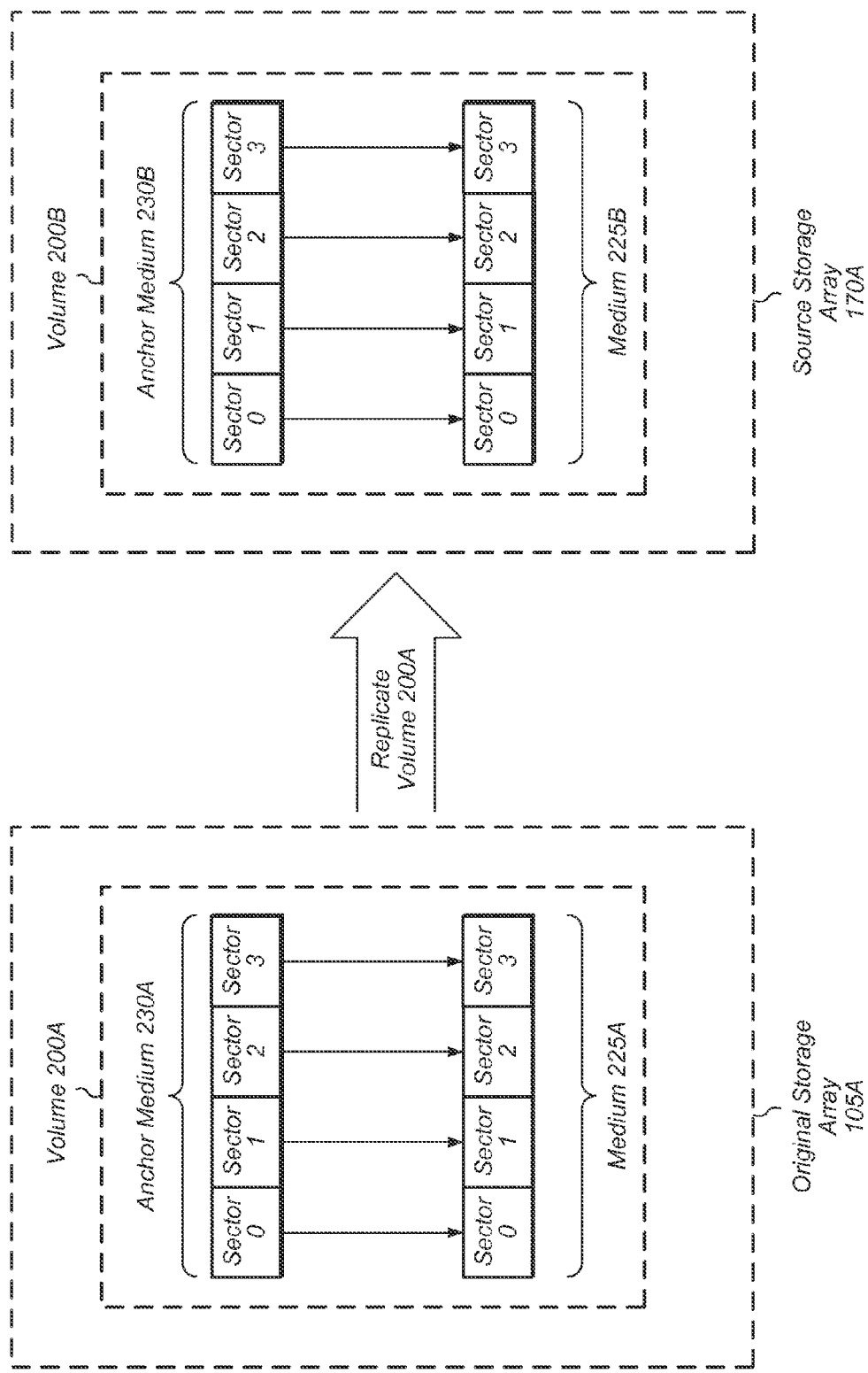
FIG. 2 is a logical block diagram illustrating a volume being replicated from a first array to a second array.

Turning now to FIG. 2, a logical block diagram illustrating a volume being replicated from a first array to a second array is shown. It may be assumed for the purposes of this discussion that volume 200A has been replicated from original storage array 105A to replica storage array 170A. Original storage array 105A and replica storage array 170A are intended to represent original storage array 105 and replica storage array 170 (of FIG. 1), respectively, at a later point in time.

The replicated version of volume 200A on replica storage array 170A is labeled as "volume 200B" so as to differentiate from the original volume 200A on original storage array 105A. Similarly, the replicated versions of anchor medium 230A and medium 225A on replica storage array 170A are labeled as "anchor medium 230B" and "medium 225B", respectively, to differentiate from the original versions on original storage array 105A.

The depiction of volume 200A illustrates the mediums which underlie volume 200A and the mappings between these mediums. For example, anchor medium 230A underlies volume 200A, and any changes to volume 200A may be recorded in anchor medium 230A. Each arrow shown in volume 200A indicates a mapping between anchor medium 230A and medium 225A, with an arrow indicating that a lookup of a given sector is mapped through medium 225A rather than through anchor medium 230A. Since an arrow is shown pointing to medium 225A for each sector of anchor medium 230A, this indicates that nothing has yet been written to anchor medium 230A. Rather, at this point in time, all of the contents of anchor medium 230A are mapped through medium 225A. It is noted that the size of sectors 0-3 may vary depending on the embodiment. It is also noted that in other embodiments, volumes and mediums may have other numbers of sectors besides four.

Although volume 200A has only two underlying mediums in its medium hierarchy, it should be understood that other volumes may have additional levels of underlying mediums. For example, in another embodiment, there may be one or more levels of mediums below medium 225 in the medium hierarchy of volume 200A. It is noted that the medium hierarchy of a volume refers to all of the mediums which are referenced by the volume and which underlie the volume. The anchor medium of a given volume is at the top of the medium hierarchy, while the oldest medium referenced by the given volume is at the bottom of the medium hierarchy. There may be any number of levels in the medium hierarchy between the anchor medium and the oldest medium, depending on the number of snapshots which have been taken of the corresponding volume.

In one embodiment, medium 225A and medium 225B may have the same global content ID but may have separate local IDs on original storage array 105A and source storage array 170A. For example, the local ID of medium 225A on original storage array 105A may map to the global content ID 225 and the local ID of medium 225B on source storage array 170A may also map to the global content ID 225. In this way, a given storage array may be able to identify which of its mediums are also present on other storage arrays. Similarly, anchor mediums 230A and 230B may have the same global content ID but may have separate local IDs on original storage array 105A and source storage array 170A.

Figure 3:
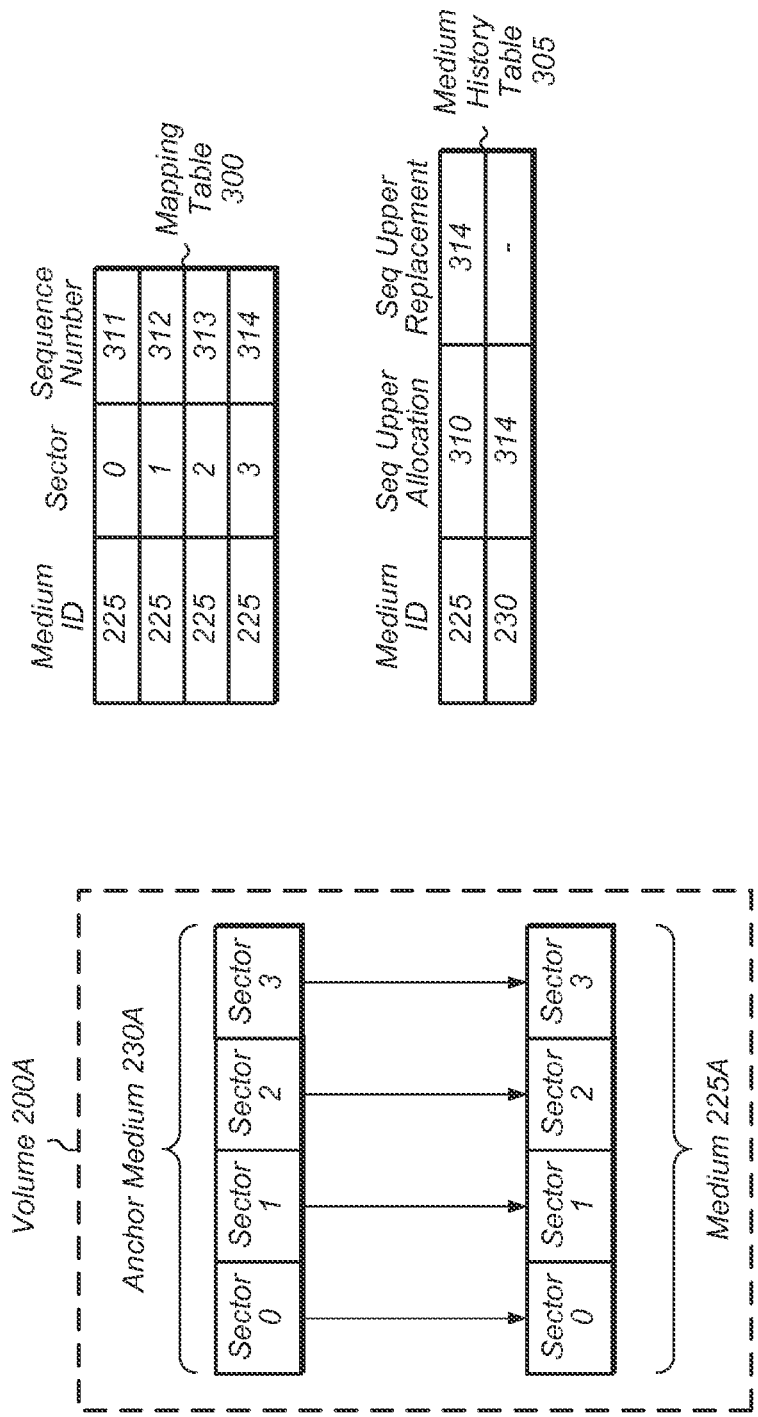
FIG. 3 is a logical block diagram illustrating a volume and corresponding mapping table entries.

Referring now to FIG. 3, a logical block diagram of one embodiment of a volume and corresponding mapping table entries are shown. Volume 200A (of FIG. 2) is shown again in FIG. 3 along with a portion of the mappings corresponding to volume 200A which may be maintained by the storage controller (not shown) of original storage array 105A.

In one embodiment, mapping table 300 may include an entry for each sector of medium 225A, and each entry may include a sequence number. In another embodiment, each sector may not be explicitly associated with a different sequence number. For example, if all of the sectors in a segment are written at about the same time they may be assigned the same sequence number, and only one number may be recorded in mapping table 300 rather than giving each sector its own number. In one embodiment, the sequence number may be used to indicate the ordering of writes to original storage array 105A. The sequence number may be a monotonically increasing number, and the sequence number may be incremented for each write operation performed to original storage array 105A. In some cases, write operations that occur close in time may share the same sequence number. The sequence number may be locally unique or globally unique depending on the embodiment.

In one embodiment, mapping table 300 may be an address translation table. It is noted that although mapping table 300 is shown as having a separate entry for each sector of medium 225, in other embodiments, each entry of mapping table 300 may correspond to a range of sectors which is an integral number of sectors. It should be understood that the entries of mapping table 300 and medium history table 305 show only pertinent attributes to avoid cluttering the figure. In other embodiments, mapping table 300 and medium history table 305 may be organized in a different manner and/or may include other information. It is also noted that any suitable data structure may be used to store the mapping table information of mapping table 300 and medium history table 305 in order to provide for efficient searches (e.g., b-trees, binary trees, hash tables, etc.). All such data structures are contemplated.

As shown in table 300, the entries for sector 0-3 of medium 225A have sequence numbers 311-314, respectively. It should be understood that multiple sequence numbers may be used for writes to the same sector, although only a single sequence number is shown for each sector in the entries of table 300. This is shown merely for ease of illustration. In other embodiments, table 300 may include other types of tags which provide a relative indication as to when the sectors were created and/or were first written to. In these other embodiments, an original medium ID, transaction ID, other identifier, or an actual timestamp may be used as the tag, rather than using the sequence number. In some embodiments, multiple tags may be maintained for each sector and/or for each entry in the mapping tables.

In one embodiment, medium history table 305 may include an entry for each medium. In other embodiments, medium history table 305 may include entries at other levels of granularity. For example, in another embodiment, medium history table 305 may include an entry for each sector, for 'N' blocks, wherein 'N' is an integer and is programmable, or for each medium range.

As shown in FIG. 3, medium history table 305 includes an entry for medium 225A and an entry for medium 230A. These entries show the medium IDs as numbers 225 and 230 without the suffix "A" for ease of illustration. Each entry may include a field for the sequence upper allocation number and a field for the sequence upper replacement number. The sequence upper allocation number indicates the highest sequence number which was used at the time the medium was created. For medium 225A, it may be assumed that the highest sequence number assigned to any range of sectors was 310 when medium 225A was created. Accordingly, 310 is recorded in the sequence upper allocation field for entry of medium 225A in table 305.

It may be assumed for the purposes of this discussion that sequence numbers 311-314 were generated by the storage controller for writes to sectors 0-3, respectively, of medium 225A. It may also be assumed that sequence number 314 was the highest sequence number which was used by the storage controller of original storage array 105A at the time a snapshot was taken of medium 225A. Therefore, sequence number 314 is recorded as the sequence upper replacement value for the entry for medium 225A in table 305.

It may be assumed that anchor medium 230A was created at the same time the snapshot was taken of medium 225A, and so sequence number 314 may be recorded as the sequence upper allocation number for medium 230A. At the point in time indicated by the logical depiction of volume 200A shown in FIG. 3, anchor medium 230A is in the read-write state and is able to receive write operations to any of its sectors. Therefore, the sequence upper replacement field of its entry in table 305 is unfilled at this point in time, but when a snapshot of anchor medium 230A is taken, the highest sequence number used at that point in time may be entered into the sequence upper replacement field of the corresponding entry in table 305.

Figure 4:
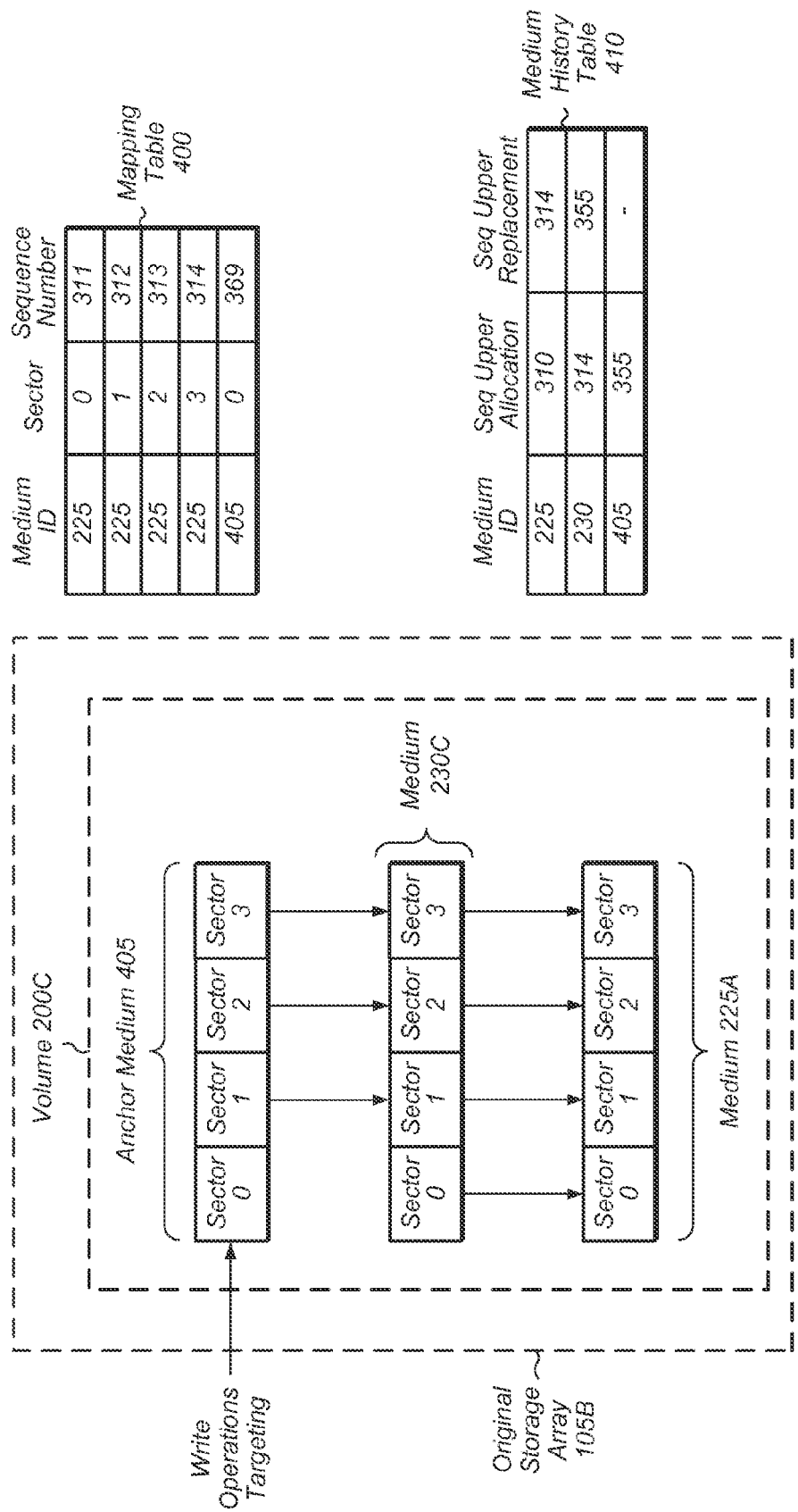
FIG. 4 illustrates a logical block diagram of one embodiment of a volume and corresponding mappings.

Turning now to FIG. 4, a logical block diagram of one embodiment of a volume and corresponding mappings are shown. Volume 200C is shown in FIG. 4 as being stored on original storage array 105B, and volume 200C and original storage array 105B are intended to represent volume 200B and original storage array 105A (of FIG. 2), respectively, at a later point in time. It may be assumed that since the previous point-in-time representation of volume 200B, a snapshot was taken of volume 200C, and after the snapshot was taken, one or more write operations were performed to sector 0 of volume 200C. Therefore, as shown in FIG. 4, volume 200C has a new anchor medium 405 which points to the previous medium 230C, while medium 230C points to medium 225A. Medium 230C is intended to represent anchor medium 230A (of FIG. 2), at a later point in time.

It may be assumed for the purposes of this discussion that the write operations targeting sector 0 of volume 200C were performed after the snapshot of volume 200B was taken. Therefore, the write operations targeting sector 0 of volume 200C have caused the previous mapping of sector 0 of anchor medium 405 to no longer be mapped to medium 230C. The last entry of mapping table 400 for medium 405 corresponds to these write operations, and this entry has a sequence number 369 assigned to it. The other entries of mapping table 400 are the same as the entries of mapping table 300 of FIG. 3.

Similarly, the last entry of medium mapping table 410 is assigned to medium 405 and has a sequence upper allocation number of 355. This indicates that the highest sequence number in use at the point in time when medium 405 was created was 355. The other entries of medium mapping table 410 are the same as the entries of medium mapping table 305 of FIG. 3.

Figure 5:
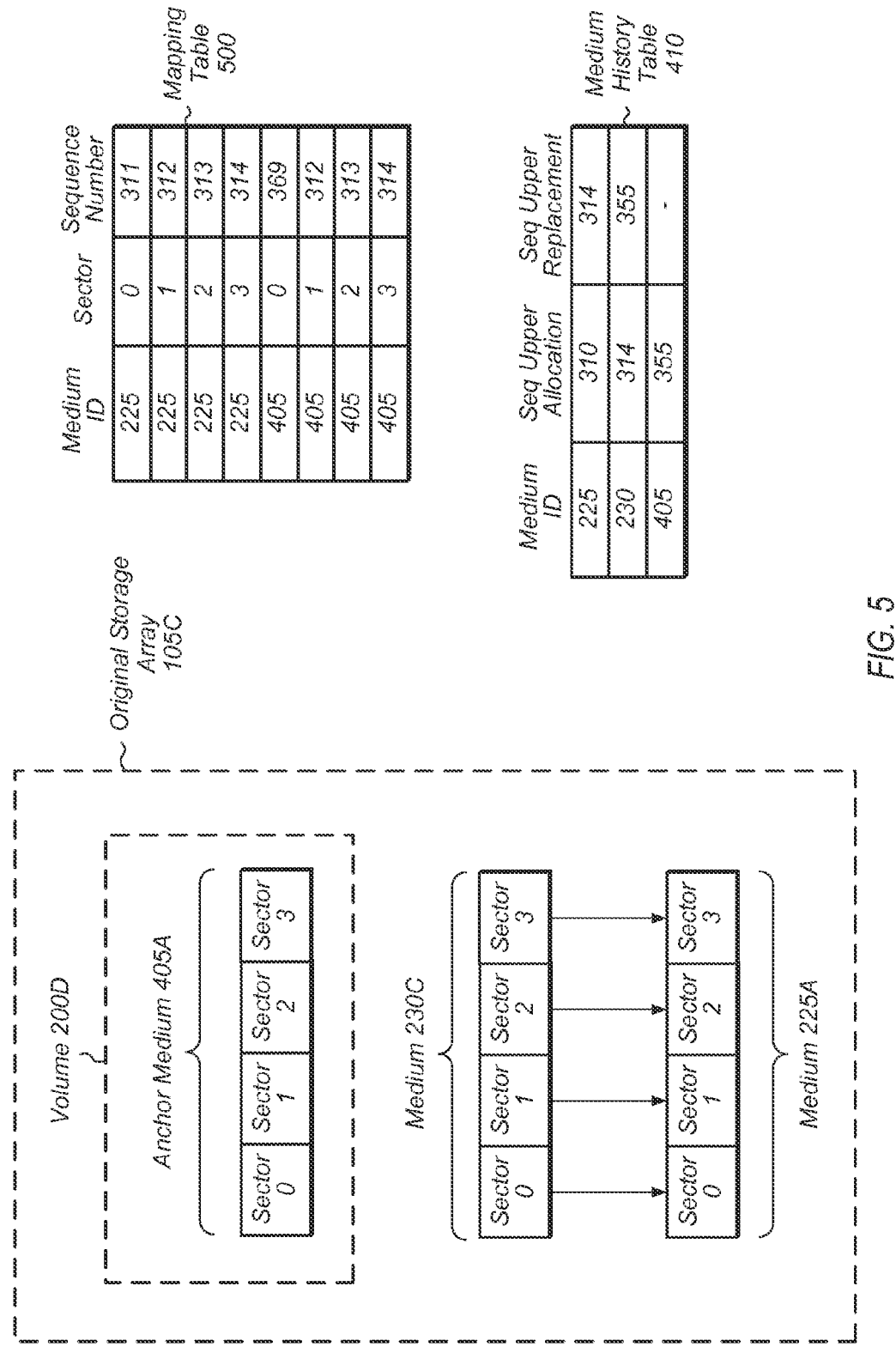
FIG. 5 is a logical block diagram of one embodiment of a volume after read optimization has been performed.

Referring now to FIG. 5, a logical block diagram of one embodiment of a volume after read optimization has been performed is shown. Original storage array 105C and volume 200D are intended to represent original storage array 105B and volume 200C (of FIG. 4), respectively, at a later point in time after read optimization has been performed on volume 200C. Similarly, anchor medium 405A is intended to represent anchor medium 405 (of FIG. 4) at a later point in time. Read optimization operations may create new address translation entries for anchor medium 405A for sectors 1-3 to make lookups to volume 200D more efficient. Previously, sectors 1-3 of anchor medium 405 were mapped through mediums 230C and 225A. However, the read optimization operations may break the links from anchor medium 405 to medium 230C and instead map everything through anchor medium 405A. It is noted that at a future point in time, mediums 230C and 225A may be garbage collected if no other mediums or volumes are mapped to these mediums. Garbage collection may be defined as a process in which storage locations are freed and made available for reuse by the system.

Generally speaking, read optimization operations make future lookups of volumes and mediums more efficient by simplifying the mappings of volumes and mediums. However, read optimization operations may make changes to the mappings which mimic user activity. This may cause old data to be replicated if the storage controller mistakenly decides that the old data is new data based on the changes made to the mappings of the old data by read optimization operations.

Figure 6:
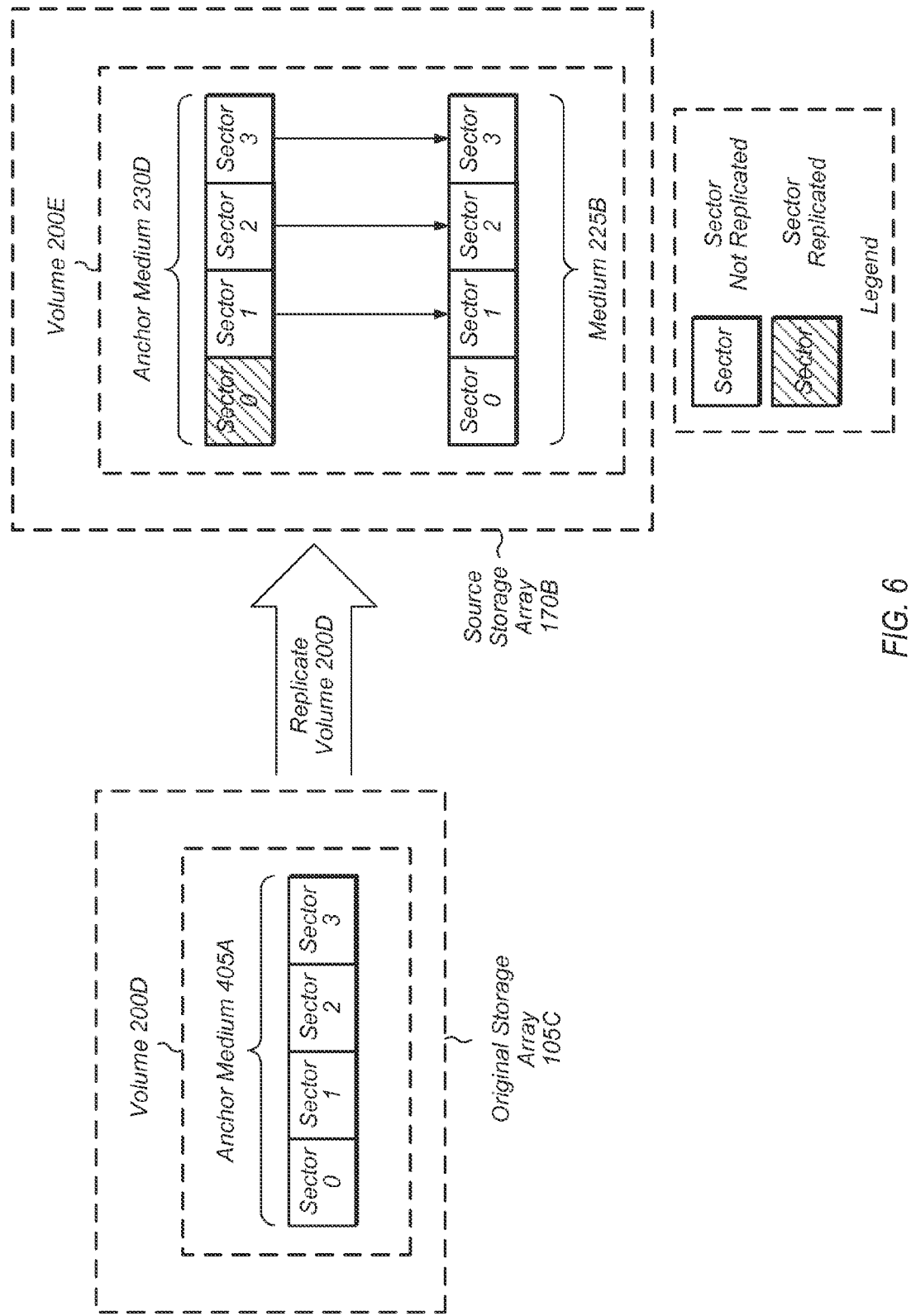
FIG. 6 is a logical block diagram of one embodiment of a replication operation.

Turning now to FIG. 6, a logical block diagram of a replication operation is shown. It may be assumed for the purposes of the discussion regarding FIG. 6 that a request to replicate volume 200D has been detected. In response to detecting this request, the storage controller of original storage array 105C may determine which sectors of volume 200D to replicate to source storage array 170B. Source storage array 170B, volume 200E, and anchor medium 230D are intended to represent source storage array 170A, volume 200B, and anchor medium 230B (of FIG. 2), respectively, at a later point in time.

The storage controller of original storage array 105C may determine which sectors of volume 200D to replicate to source storage array 170B by querying mapping table 500 of FIG. 5. As noted previously, the entries for medium 405 in mapping table 500 make it appear as though all sectors of medium 405 have been updated by user writes. However, to avoid replicating sectors which do not need to be replicated, the storage controller may compare the sequence numbers of the entries for medium 405 in table 500 to the highest sequence number in use the last time volume 200A was replicated to source storage array 170A (as shown in FIG. 2). It may be assumed that the highest sequence number was 314 when volume 200A was replicated from original storage array 105A to source storage array 170A. Therefore, storage controller may only replicate sectors with a sequence number higher than 314. Accordingly, sector 0, with a sequence number of 369, will be the only sector replicated to source storage array 170B. Sector 0 of anchor medium 230D is shown with diagonal lines to indicate it has been replicated from original storage array 105B to source storage array 170B. The storage controller may prevent sectors 1-3 from being replicated since their sequence numbers are less than or equal to 314.

Figure 7:
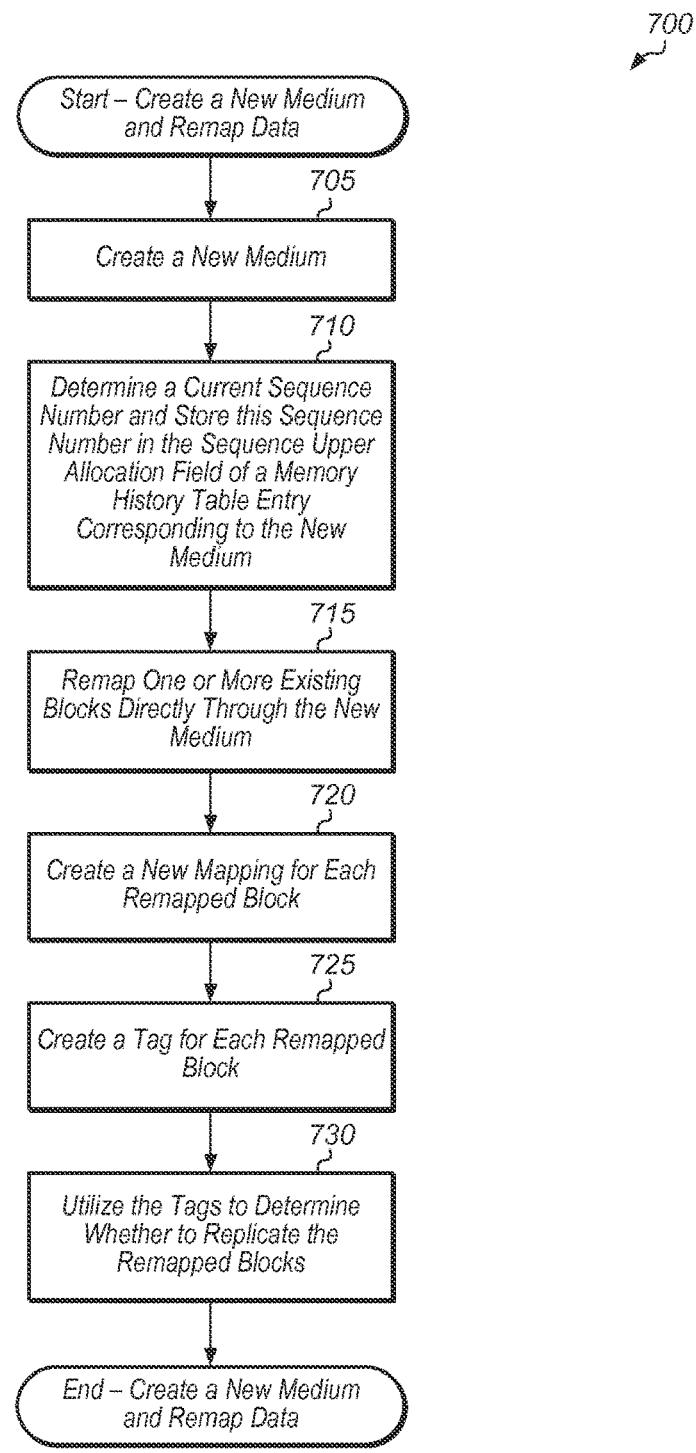
FIG. 7 is a generalized flow diagram illustrating one embodiment of a method for creating a new medium and remapping data.

Referring now to FIG. 7, one embodiment of a method 700 for creating a new medium and remapping data is shown. The components embodied in system 100 described above (e.g., storage controller 110) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

In one embodiment, a storage controller may create a new medium (block 705). The storage controller may create the new medium as a result of any of a variety of operations or detected conditions. For example, in one embodiment, a storage controller may create the new medium as a result of taking a snapshot of an existing volume. In this case, the new medium may be a new anchor medium for the existing volume. In other embodiments, the new medium may be created for a new volume or for any of a variety of other reasons. In response to creating the new medium, the storage controller may be configured to determine a current sequence number and store this sequence number in the sequence upper allocation field of a medium history table entry corresponding to the new medium (block 710). In other embodiments, the current sequence number may be stored in other tables and/or other locations. If an older medium (e.g., the previous anchor medium of the volume) is being made stable at the same time the new medium is created, then the current sequence number may also be stored in the sequence upper replacement field of a medium history table entry corresponding to the old medium.

Next, the storage controller may remap one or more existing data blocks directly through the new medium (block 715). These one or more existing blocks may already be stored in the storage array and mapped through an older medium, and these one or more existing blocks may be remapped such that they now are mapped directly through the new medium. For example, in one embodiment, the one or more existing blocks may be remapped directly through the new medium as part of read optimization and/or garbage collection operations. In other embodiments, the one or more existing blocks may be remapped directly through the new medium as part of other types of operations. It is noted that the storage controller may remap data at other levels of granularity than blocks in other embodiments. For example, the storage controller may remap data of existing sectors, existing portions of mediums, or other amounts of data stored in the storage array.

As part of remapping the one or more blocks directly through the new medium, the storage controller may create a new mapping for each remapped block (block 720). The one or more mappings may include one or more entries in an address translation table, a medium history table, a medium mapping table, and/or one or more other tables. Next, the storage controller may create a tag for each of the one or more blocks which have been remapped (block 725). The tag may include one or more fields which allow the storage controller to determine when the one or more blocks were originally written, and/or with which medium or volume they were originally associated, and/or if the one or more blocks have been previously replicated. In one embodiment, the storage controller may create the tag from information stored in an original mapping associated with the one or more blocks. For example, in one embodiment, the storage controller may copy the sequence number from an existing mapping into the new mapping for the one or more blocks. Then, at a later point in time, the storage controller may utilize the tags to determine whether to replicate the remapped blocks during a replication operation (block 730). For example, if each tag is a sequence number, the storage controller may compare each sequence number to the highest sequence number in use during a prior replication operation. Then, the storage controller may only replicate data with sequence numbers larger than this previously recorded highest sequence number in use. After block 730, method 700 may end.

Figure 8:
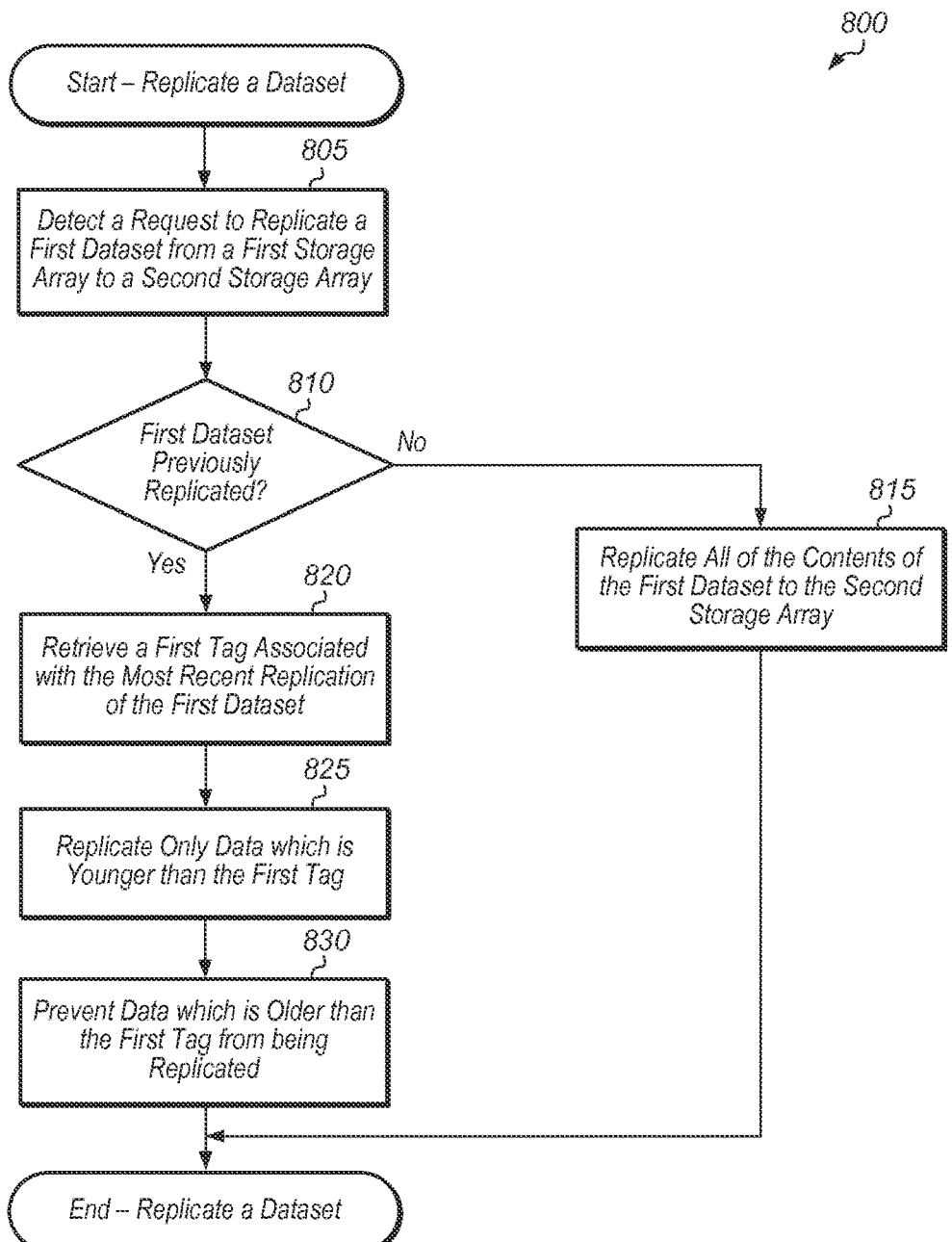
FIG. 8 is a generalized flow diagram illustrating one embodiment of a method for replicating a dataset.

Turning now to FIG. 8, one embodiment of a method 800 for replicating a dataset is shown. The components embodied in system 100 described above (e.g., storage controller 110) may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment.

A request to replicate a first dataset from a first storage array to a second storage array may be detected (block 805). In one embodiment, the first dataset may be a volume. Next, it may be determined if the first dataset has been previously replicated from the first storage array to the second storage array (conditional block 810). If the first dataset has not been previously replicated from the first storage array to the second storage array (conditional block 810, "no" leg), then all of the contents of the first dataset may be replicated to the second storage array (block 815).

If the first dataset has been previously replicated from the first storage array to the second storage array (conditional block 810, "yes" leg), then the storage controller may retrieve a first tag associated with the most recent replication of the first dataset (block 820). The first tag may identify a time, original medium ID, and/or sequence number associated with the most recent replication of the first dataset from the first storage array to the second storage array. Next, the storage controller may step through the mappings of the first dataset and replicate only the data which is younger than the first tag (block 825). Also, the storage controller may prevent data which is older than the first tag from being replicated (block 830). After block 830, method 800 may end.

Figure 9:
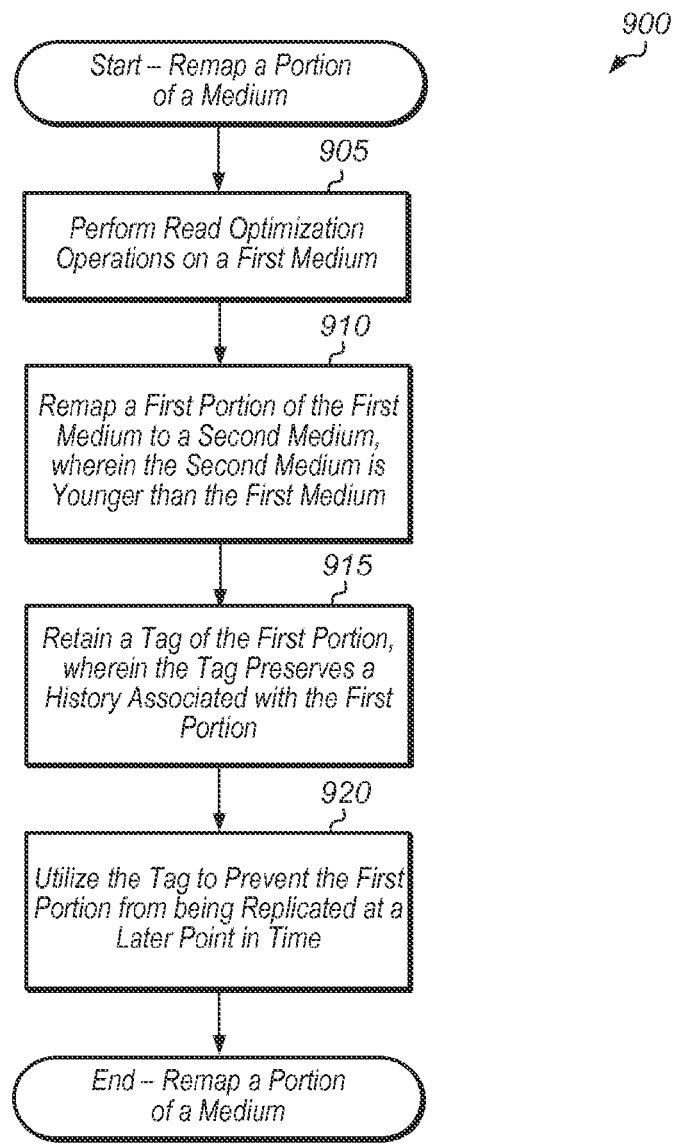
FIG. 9 is a generalized flow diagram illustrating one embodiment of a method for remapping a portion of a medium.

Referring now to FIG. 9, one embodiment of a method 900 for remapping a portion of a medium is shown. The components embodied in system 100 described above (e.g., storage controller 110) may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment.

In one embodiment, a storage controller may perform read optimization operations on a first medium of a first dataset (block 905). As part of the read optimization operations, a first portion of the first medium may be remapped to a second medium, wherein the second medium is younger than the first medium (block 910). The first portion of the first medium may be a block, sector, or region, depending on the embodiment.

As part of the remapping of the first portion of the first medium to the second medium, the storage controller may retain a tag of the first portion, wherein the tag preserves a history associated with the first portion (block 915). In various embodiments, the tag may be a sequence number, timestamp, original medium ID, or other ID. At a later point in time, the storage controller may utilize the tag to prevent the remapped first portion from being replicated as part of a replication operation of the first dataset (block 920). For example, the storage controller may utilize the tag to identify the first portion with a previously replicated version of the first dataset. In other words, the storage controller may determine that the first portion had been previously replicated even though the first portion has been remapped to the second medium since the previous replication operation was performed. After block 920, method 900 may end.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
one or more storage devices; and
a storage controller coupled to the one or more storage devices, wherein the storage controller is configured to:
   perform a first replication operation that replicates stored data associated with a first logical grouping of data, wherein the first logical grouping of data corresponds to an indication of user write activity wherein user write activity updates a sequence number;
   subsequent to performing the first replication operation, perform a read optimization operation that remaps a portion of the first logical grouping of data to generate a second logical grouping of data, wherein a remapping for the stored data within the second logical grouping of data corresponds to an indication of system write activity, wherein system write activity does not update a sequence number;
   determining whether the remapping for the stored data within the second logical grouping of data corresponds to system write activity instead of user write activity; and
   in response to determining that the remapping for the stored data within the second logical grouping of data corresponds to system write activity instead of user write activity, prevent the stored data from being replicated during a second replication operation involving the second logical grouping of data through use of the sequence number.

2. The system as recited in claim 1, wherein the first logical grouping of data is older than the second logical grouping of data.

3. The system as recited in claim 1, wherein the storage controller is further configured to:
   record a current sequence number when the second logical grouping of data is created.

4. A method comprising:
by a storage controller coupled to one or more storage devices:
performing a first replication operation that replicates stored data associated with a first logical grouping of data, wherein the first logical grouping of data corresponds to an indication of user write activity wherein user write activity updates a sequence number;
subsequent to performing the first replication operation, performing a read optimization operation that remaps a portion of the first logical grouping of data to generate a second logical grouping of data, wherein a remapping for the stored data within the second logical grouping of data corresponds to an indication of system write activity, wherein system write activity does not update a sequence number;
determining whether the remapping for the stored data within the second logical grouping of data corresponds to system write activity instead of user write activity; and
in response to determining that the remapping for the stored data within the second logical grouping of data corresponds to system write activity instead of user write activity, prevent the stored data from being replicated during a second replication operation involving the second logical grouping of data through use of the sequence number.

5. The method as recited in claim 4, wherein the first logical grouping of data is older than the second logical grouping of data.

6. The method as recited in claim 4, further comprising: recording a current sequence number when the second logical grouping of data is created.

7. A non-transitory computer readable storage medium storing program instructions, wherein the program instructions are executable by a processor to:
by a storage controller coupled to one or more storage devices:
perform a first replication operation that replicates stored data associated with a first logical grouping of data, wherein the first logical grouping of data corresponds to an indication of user write activity wherein user write activity updates a sequence number;
subsequent to performing the first replication operation, perform a read optimization operation that remaps a portion of the first logical grouping of data to generate a second logical grouping of data, wherein a remapping for the stored data within the second logical grouping of data corresponds to an indication of system write activity, wherein system write activity does not update a sequence number;
determining whether the remapping for the stored data within the second logical grouping of data corresponds to system write activity instead of user write activity; and
in response to determining that the remapping for the stored data within the second logical grouping of data corresponds to system write activity instead of user write activity, prevent the stored data from being replicated during a second replication operation involving the second logical grouping of data through use of the sequence number.

8. The non-transitory computer readable storage medium as recited in claim 7, wherein the first logical grouping of data is older than the second logical grouping of data.

9. The non-transitory computer readable storage medium as recited in claim 7, wherein the program instructions are further executable by a processor to:
record a current sequence number when the second logical grouping of data is created.

* * * * *